United States Patent
Awwad et al.

(10) Patent No.: US 10,122,461 B2
(45) Date of Patent: Nov. 6, 2018

(54) METHOD FOR SELECTING MODES FOR TRANSMISSION OVER MULTIMODE OR MULTICORE OPTICAL FIBRES

(71) Applicant: INSTITUT MINES-TELECOM, Paris (FR)

(72) Inventors: Elie Awwad, Paris (FR); Ghaya Rekaya-Ben Othman, Antony (FR); Yves Jaouen, Paris (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/508,775

(22) PCT Filed: Sep. 4, 2015

(86) PCT No.: PCT/EP2015/070202
§ 371 (c)(1),
(2) Date: Mar. 3, 2017

(87) PCT Pub. No.: WO2016/037930
PCT Pub. Date: Mar. 17, 2016

(65) Prior Publication Data
US 2017/0264367 A1    Sep. 14, 2017

(30) Foreign Application Priority Data

Sep. 8, 2014   (FR) ...................... 14 58379

(51) Int. Cl.
*H04B 10/2581*   (2013.01)
*H04B 10/079*    (2013.01)
(Continued)

(52) U.S. Cl.
CPC ....... *H04B 10/2581* (2013.01); *H04B 7/0413* (2013.01); *H04B 10/0795* (2013.01); *H04J 14/04* (2013.01)

(58) Field of Classification Search
None
See application file for complete search history.

(56) References Cited

U.S. PATENT DOCUMENTS 9,294,146 B2    3/2016  Mumtaz et al.
9,838,268 B1 *  12/2017 Mattson ................. H04L 41/32
(Continued)

FOREIGN PATENT DOCUMENTS

DE    102007015225 A1    10/2008
FR         2977099 A1    12/2012

OTHER PUBLICATIONS

International Search Report for PCT/EP2015/070202, dated Nov. 13, 2015.
(Continued)

*Primary Examiner* — Darren E Wolf
(74) *Attorney, Agent, or Firm* — Meagher Emanuel Laks Goldberg & Liao, LLP

(57) ABSTRACT

The invention relates to a mode selection method for a system for MIMO transmission on an optical fiber of multimode type. It comprises a step of measuring the transfer matrix of the transmission channel made up of a set of modes of the optical fiber (110), a step of transforming (120) the transfer matrix into a block diagonal matrix, each block being associated with a mode subset, a step of determining (130) the gain and/or the transmission capacity for each of the mode subsets, and a selection (140) of the mode subset corresponding to the highest gain and/or capacity, the MIMO transmission system then using only the modes of the subset thus selected to transmit on the optical fiber.

The invention relates also to a core selection method for a system for MIMO transmission on optical fiber of multicore type.

18 Claims, 2 Drawing Sheets

(51) Int. Cl.
*H04B 7/0413* (2017.01)
*H04J 14/04* (2006.01)

(56) References Cited

U.S. PATENT DOCUMENTS

2010/0195965 A1* 8/2010 Sasaoka ............ G02B 6/02042
  385/126
2014/0161439 A1 6/2014 Nolan

OTHER PUBLICATIONS

International Written Opinion for PCT/EP2015/070202, dated Nov. 13, 2015.
Cvijetic N. et al., "Block-Diagonal MIMO Equalization for Polarization-Multiplexed OFDM Transmission With Direct Detection", IEEE Photonics Technology Letters, IEEE Service Center, Piscataway, NJ, US, vol. 23, No. 12, Jun. 1, 2011 (Jun. 1, 2011), pp. 792-794.
Mori Takayoshi et al., "Wideband WDM coherent optical MIMO transmission over 50 [mu]m-core GE-MMF using selective mode excitation techn", Optical Fiber Technology, vol. 19, No. 6, 2013, pp. 658-664.
Hsu R C J et al., "Coherent Optical MIMO (COMIMO)", Journal of Lightwave Technology. IEEE, Service Center, New York, NY, US, vol. 23, No. 8, Aug. 1, 2005 (Aug. 1, 2005), pp. 2410-2419.
S. Randel et al. entitled "6×56 Gb/s mode-division multiplexed transmission over 33-km few-mode fiber enabled by 6×6 MIMO equalization" published in Optics Express, vol. 19, No. 17, 16697-16707 (Aug. 15, 2011).

* cited by examiner

METHOD FOR SELECTING MODES FOR TRANSMISSION OVER MULTIMODE OR MULTICORE OPTICAL FIBRES

TECHNICAL FIELD

The present invention relates generally to the field of optical telecommunications and more particularly those using optical fibers of multimode or multicore type.

PRIOR ART

Optical transmissions over long distances (from a few hundred to a few thousand kilometers) use single-mode optical fibers. These offer the advantage of not exhibiting mode distortion (except for polarization mode distortion) and of being able to support high bit rates of several tens of Gbits/s per wavelength, and do so for a plurality of wavelengths.

However, for transmissions over short distances, notably for broadband local area networks (LANs), the multimode or multicore fibers constitute a particularly interesting alternative to the single-mode fibers. The multimode fibers are currently available in the form of plastic optical fibers (or POF) or silica optical fibers.

The multimode fibers have a core of large diameter allowing the propagation of several guided spatial modes, denoted $LP_{lp}$ for a linear polarization in which l is the azimuth mode index and p the radial mode index. The mode $LP_{01}$ is the fundamental mode, the only one to be able to be propagated in a single-mode fiber. The total number of modes $LP_{lp}$ depends on the optogeometric parameters (diameter of the core, index profile). Furthermore, for each spatial mode $LP_{lp}$, two orthogonal polarization states can be defined. The information to be transmitted is distributed over the different guided modes (and if necessary over the different polarizations of these modes). When the number of guided modes is low, the fiber is called a few-mode optical fiber. More specifically, an optical fiber is called few-mode if its normalized frequency parameter V is such that V<8.

The capacity of the multimode fibers is generally greater than that of the single-mode fibers, each mode being separately modulated and the signal to be transmitted being multiplexed over the different modes. This capacity is however limited by the inter-mode coupling $L_{lp}$ in the propagation (intermodal crosstalk).

The multicore fibers comprise a plurality of cores (typically from 2 to 7 cores) in a common cladding. The dimension of the cores is generally small enough to allow only a single-mode propagation in each of them. In this case, they do not exhibit any intermode distortion. On the other hand, the evanescent waves create a coupling between the different cores (inter-core crosstalk), the level of crosstalk increases as the number of cores increases and the inter-core distance decreases. Like the intermodal coupling described previously, the inter-core coupling limits the range of these systems.

MIMO (Multiple Input Multiple Output) techniques can be implemented to separate the transmission over the different modes or the different cores and thus increase the transmission capacity, like multi-antenna wireless telecommunication systems with space diversity. A description of a method for MIMO optical transmission over multimode optical fiber will be able to be found in the article by S. Randel et al. entitled "6×56 Gb/s mode-division multiplexed transmission over 33-km few-mode fiber enabled by 6×6 MIMO equalization" published in Opt. Express 19, 16697-16707 (2011).

More recently, the application FR-A-2977099 in the name of the present applicant proposed using a space-time coding to transmit symbols over a plurality of modes (in a few-mode fiber) or cores. This technique makes it possible to significantly reduce the bit error ratio compared to the uncoded MIMO optical transmission system mentioned above.

However, the MIMO optical transmissions, with or without space-time coding, over multimode or multi-core-type fibers, are complex to implement for a high number of modes/cores, the complexity of the processing in reception varying, depending on the decoding type, at best in terms of $O(M^3)$ in which M is the number of modes/cores of the fiber. Furthermore, the processing concerned requires M RF sub-systems in parallel, which commensurately affects the cost of the transceivers. To reduce both the processing complexity and the costs, it is necessary to select the modes/cores through which the transmission will be carried out.

The aim of the present invention is to propose an original method for selecting modes in a multimode fiber/cores in a multicore fiber for an MIMO optical system.

SUMMARY OF THE INVENTION

The present invention is defined by a mode selection method for a system for MIMO transmission over multi-mode optical fiber comprising:

(a) a step of measuring the transfer matrix of the transmission channel made up of a set of modes of said optical fiber;

(b) an operation of transforming said transfer matrix into a block diagonal matrix, each block relating to a mode subset of said optical fiber;

(c) a step of determining a gain and/or a transmission capacity (130) for each of the mode subsets associated with said blocks;

(d) a step of selecting the mode subset corresponding to the highest gain and/or capacity, the MIMO transmission system then using only the modes of the subset thus selected to transmit over said optical fiber.

The transformation of the transfer matrix advantageously comprises a thresholding step in which all the elements of the matrix below a predetermined threshold value are set to zero, followed by a step of reorganization of the transfer matrix thus obtained, by permutation of its rows and columns, the permutations on the rows and those on the columns being identical.

According to a first variant, the mode subset is selected according to the gain criterion $$n_{opt} = \underset{n=1,\ldots,N}{\operatorname{argmax}} (\gamma_n)$$

in which $\gamma_n = \operatorname{Tr}(H_n H_n^H)$, N being the number of mode subsets, $H_n$ being the transfer matrix of the transmission channel reduced to the modes of the subset n, $H_n^H$ being the conjugate transpose matrix of $H_n$ and $\operatorname{Tr}(\bullet)$ being the trace function.

According to a second variant, the mode subset is selected according to the gain criterion $$n_{opt} = \underset{n=1,\ldots,N}{\operatorname{argmax}}\left(\frac{\gamma_n}{M_n}\right)$$

in which $\gamma_n = \operatorname{Tr}(H_n H_n^H)$, N being the number of mode subsets, $M_n$ being the cardinal of the subset n, $H_n$ being the transfer matrix of the transmission channel reduced to the modes of the subset n, $H_n^H$ being the conjugate transpose matrix of $H_n$ and $\operatorname{Tr}(\bullet)$ being the trace function.

According to a third variant, the mode subset is selected according to a capacity criterion $$n_{opt} = \underset{n=1,\ldots,N}{\operatorname{argmax}}(C_n)$$

in which $$C_n = \sum_{m=1}^{M_n} \log\left(1 + \gamma_n^m \frac{P_e}{M_n N_0}\right),$$

$M_n$ being the cardinal of the subset n, $\gamma_n^m$ being the gain of the transmission channel on the mode m of the subset n, $P_e$ being the transmission power distributed over the $M_n$ modes and $N_0$ being the noise power on reception on a mode.

According to a fourth variant, the mode subset is selected according to a hybrid gain and capacity criterion $$n_{opt} = \underset{n=1,\ldots,N}{\operatorname{argmax}}(\Phi(C_n, \gamma_n))$$

in which $C_n$ is the capacity of the transmission channel reduced to the modes of the subset n, $\gamma_n = \operatorname{Tr}(H_n H_n^H)$ in which $H_n$ being the transfer matrix of the transmission channel reduced to the modes of the subset n, $H_n^H$ being the conjugate transpose matrix of $H_n$ and $\operatorname{Tr}(\bullet)$ being the trace function, and in which $\Phi(\bullet,\bullet)$ is an increasing function of $C_n$ and $\gamma_n$.

Following the selection of the mode subset, the degree of modulation of the symbols to be transmitted on the different modes can be chosen to be equal to a value Q' such that M' log Q'=M log Q in which M is the cardinal of the mode set before selection, M' is the cardinal of the mode subset selected and Q is the degree of modulation of the symbols to be transmitted before the selection of the mode subset.

Alternatively, following the selection of the mode subset, the degree of modulation of the symbols to be transmitted on the different modes is chosen to be different for the different modes of the mode subset.

Finally, the symbols to be transmitted can be subjected to a space-time coding, the elements of the space-time code being then transmitted only on the modes of said mode subset selected.

The invention relates also to a core selection method for a system for MIMO transmission over multicore optical fiber comprising:

(a) a step of measuring the transfer matrix of the transmission channel made up of a set of cores of said optical fiber;

(b) an operation of transforming said transfer into a block diagonal matrix, each block relating to a subset of cores of said optical fiber;

(c) a step of determining a gain and/or a transmission capacity for each of the core subsets associated with said blocks;

(d) a step of selecting the core subset corresponding to the highest gain and/or capacity, the MIMO transmission system then using only the cores of the subset thus selected to transmit over said optical fiber.

The transformation of the transfer matrix advantageously comprises a thresholding step in which all the elements of the matrix below a predetermined threshold value are set to zero, followed by a step of reorganization of the transfer matrix thus obtained, by permutation of its rows and columns, the permutations on the rows and those on the columns being identical.

According to a first variant, the core subset is selected according to the gain criterion $$n_{opt} = \underset{n=1,\ldots,N}{\operatorname{argmax}}(\gamma_n)$$

in which $\gamma_n = \operatorname{Tr}(H_n H_n^H)$, N being the number of core subsets, $H_n$ being the transfer matrix of the transmission channel reduced to the cores of the subset n, $H_n^H$ being the conjugate transpose matrix of $H_n$ and $\operatorname{Tr}(\bullet)$ being the trace function.

According to a second variant, the core subset is selected according to the gain criterion $$n_{opt} = \underset{n=1,\ldots,N}{\operatorname{argmax}}\left(\frac{\gamma_n}{M_n}\right)$$

in which $\gamma_n = \operatorname{Tr}(H_n H_n^H)$, N being the number of core subsets, $M_n$ being the cardinal of the subset n, $H_n$ being the transfer matrix of the transmission channel reduced to the cores of the subset n, $H_n^H$ being the conjugate transpose matrix of $H_n$ and $\operatorname{Tr}(\bullet)$ being the trace function.

According to a third variant, the core subset is selected according to a capacity criterion $$n_{opt} = \underset{n=1,\ldots,N}{\operatorname{argmax}}(C_n)$$

in which $$C_n = \sum_{m=1}^{M_n} \log\left(1 + \gamma_n^m \frac{P_e}{M_n N_0}\right),$$

$M_n$ being the cardinal of the subset n, $\gamma_n^m$ being the gain of the transmission channel on the core m of the subset n, $P_e$ being the transmission power distributed over the $M_n$ cores and $N_0$ being the noise power on reception on a core.

According to a fourth variant, the core subset is selected according to a hybrid gain and capacity criterion $$n_{opt} = \underset{n=1,\ldots,N}{\operatorname{argmax}}(\Phi(C_n, \gamma_n))$$

in which $C_n$ is the capacity of the transmission channel reduced to the cores of the subset n, $\gamma_n = \operatorname{Tr}(H_n H_n^H)$ in which $H_n$ being the transfer matrix of the transmission channel reduced to the cores of the subset n, $H_n^H$ being the conjugate transpose matrix of $H_n$ and $Tr(\bullet)$ being the trace function, and in which $\Phi(\bullet,\bullet)$ is an increasing function of $C_n$ and $\gamma_n$.

Following the selection of the core subset, the degree of modulation of the symbols to be transmitted on the different cores can be chosen to be equal to a value Q' such that M' log Q'=M log Q in which M is the cardinal of the set of cores before selection, M' is the cardinal of the core subset selected and Q is the degree of modulation of the symbols to be transmitted before the selection of the core subset.

Alternatively, following the selection of the core subset, the degree of modulation of the symbols to be transmitted on the different cores can be chosen to be different for the different cores of the subset.

Advantageously, the symbols to be transmitted are subjected to a space-time coding, the elements of the space-time code being then transmitted only on the cores of said mode subset selected.

BRIEF DESCRIPTION OF THE DRAWINGS

Other features and advantages of the invention will become apparent on reading about preferred embodiments of the invention, with reference to the attached figures in which.

DETAILED EXPLANATION OF PARTICULAR EMBODIMENTS

Figure 1:
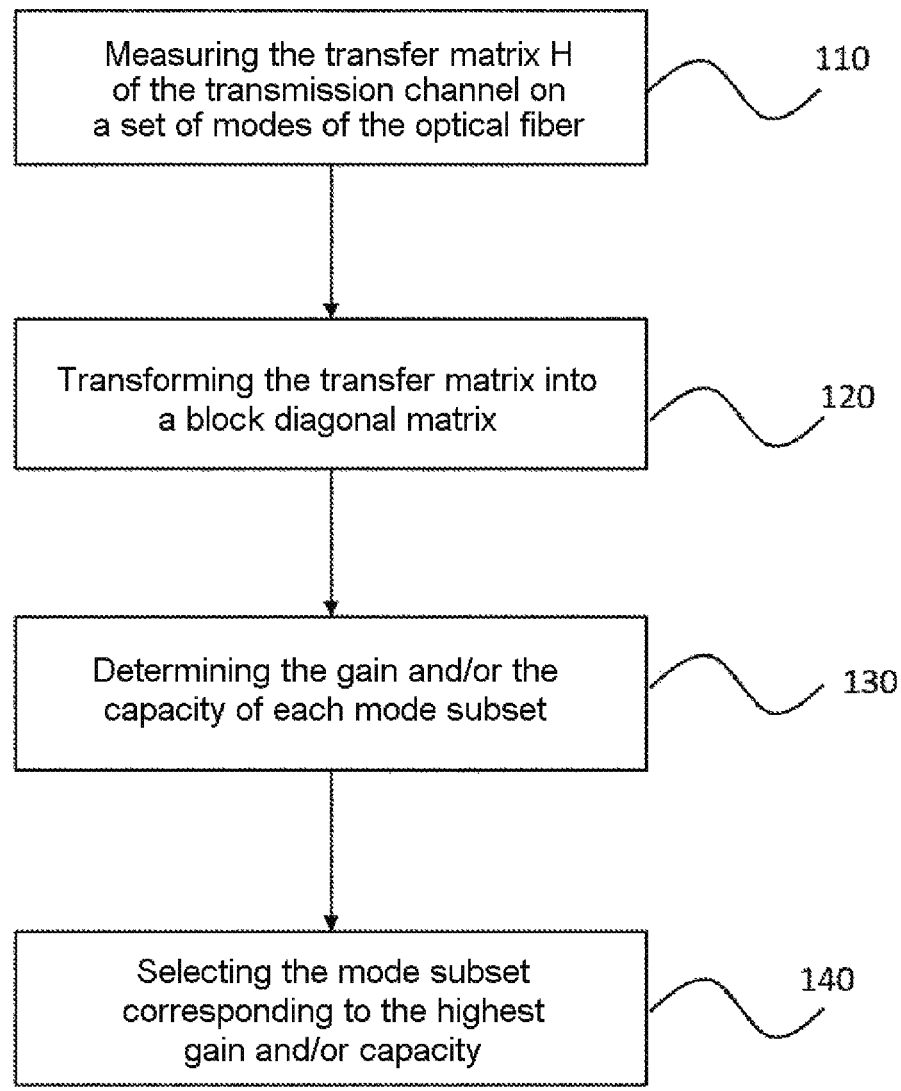
FIG. 1 schematically represents a mode selection method for a system for MIMO transmission over multimode optical fiber, according to a first embodiment of the invention.

The invention will first be explained in the case of a system for MIMO transmission over multimode optical fiber. In such a system, the symbols to be transmitted at a given instant are multiplexed over a plurality M of modes of the fiber (and, if necessary, for a given mode, over two different polarizations). On reception, the signals received over the different modes are supplied, for example, to a maximum likelihood (ML) detector to estimate the symbols transmitted.

The transmission channel made up of the M modes of the optical fiber can then be modelled by:

$$Y = HX + N \quad (1)$$

in which X is a vector of size M whose elements are the complex symbols transmitted, H is a matrix of size M×M representing the function of the transmission channel and called transfer matrix of the channel, Y is a vector of size M representative of the complex signals received over the different modes and N is a vector of size M whose elements are samples of assumed Gaussian additive white noise and of variance $N_0$ per mode.

The multimode fiber in fact comprises a plurality L of segments, an amplifier being provided between each pair of consecutive segments. Each fiber segment can be conceptually divided into K consecutive sections, the characteristics of the fiber being stationary over the length of each section. The transfer matrix over each segment can be obtained by a matrix product $T_{l,k} R_{l,k}$ in which $R_{l,k}$, of size M×M is the intermodal coupling matrix, relating to the section k of the segment l, and $T_{l,k}$ is a diagonal matrix, also of size M×M, whose diagonal elements give the respective phase shifts of the different modes over the section k of the segment l.

Each coupling matrix $R_{l,k}$ can be modelled as an orthogonal random matrix ($R_{l,k} \cdot R_{l,k}^T = I_M$ in which $I_M$ is the identity matrix), which gives the conservation of the energy distributed over the different modes. The non-diagonal coefficients of the coupling matrix are the intermodal coupling coefficients. Their values depend on the integrals of overlap of the field distributions between the different modes being propagated in the section of the segment concerned. The integrals of overlap themselves depend on the imperfections and on the curvature of the fiber segment in this section.

The matrix $T_{l,k}$ is a matrix whose diagonal coefficients are of the form $e^{j\Theta_{l,k}^n}$ in which $\theta_{l,k}^n$ is the result of the drawing of a random variable uniformly distributed over $[0, 2\pi]$.

Finally, the amplifier between two segments l and l+1 can be modelled by a gain matrix $G_l$. More specifically $G_l$ is a diagonal matrix of size M×M whose elements give the respective gains of the amplifier for the different modes. The matrix $G_l$ can be represented by the product of an average (scalar) gain with an offset matrix around this gain.

Ultimately, the transfer matrix of the transmission channel can be expressed in the form:

$$H = \prod_{\ell=1}^{L} \left( G_\ell \prod_{k=1}^{K} (T_{\ell,k} R_{\ell,k}) \right) \quad (2)$$

the product over k being relative to one and the same section and the product over l being relative to one and the same segment.

In practice, the matrix H reveals mode subsets, the modes belonging to one and the same subset being coupled together and the modes belonging to distinct subsets being only weakly or not at all coupled. In other words, the intermodal coupling acts significantly only within determined mode subsets.

If the modes are grouped together by subsets, for example by performing permutations on the rows and corresponding permutations on the columns of the transfer matrix of the transmission channel H, a block diagonal matrix is obtained, that is to say one that takes the following form:

$$H = \begin{pmatrix} H_1 & 0 & \cdots & 0 \\ 0 & H_2 & \ddots & \vdots \\ \vdots & \ddots & \ddots & 0 \\ 0 & \cdots & 0 & H_N \end{pmatrix} \quad (3)$$

in which the matrices (or blocks) $H_n$, n=1, ..., N are square matrices of sizes $M_n \times M_n$, such that $$\sum_{n=1}^{N} M_n = M.$$

The terms outside of the diagonal of the blocks $H_n$ are represented in (3) as zeros but in practice they can be simply lower than a minimum coupling threshold.

The idea on which the invention is based is to select, in transmission, a mode subset corresponding to one of the blocks $H_n$, n=1, ..., N, out of the M modes of the fiber. This selection is advantageously performed according to a gain criterion and/or a capacity criterion, as described hereinbelow. On reception, it will be possible to use only the subset of modes selected or even a superset thereof, even all the modes, to decode the information. In effect, it may be interesting to recover information in modes which, although not selected and therefore not used by the transmitter, contain information, the choice being made according to a trade-off criterion between performance and complexity.

The gain criterion can be envisaged according to different variants. The gain term should be understood here in its widest accepted sense, inasmuch as the gain value can be lower than 1.

If it is assumed that the transmission of the symbols is performed by means of the modes associated with the block $H_n$, the power gain can be expressed by:

$$\gamma_n \mathrm{Tr}(H_n H_n^H) \tag{4}$$

According to this variant, the gain values $\gamma_n$, are calculated for the different subsets $n=1, \ldots, N$ and the subset $n_{opt}$ is retained that makes it possible to obtain the maximum gain (the minimum loss):

$$n_{opt} = \underset{n=1,\ldots,N}{\mathrm{argmax}}(\gamma_n) \tag{5}$$

According to another variant, it will be possible to select the mode subset for which the average gain per mode is highest, in other words:

$$n_{opt} = \underset{n=1,\ldots,N}{\mathrm{argmax}}\left(\frac{\gamma_n}{M_n}\right) \tag{6}$$

Other variants will alternatively be able to be considered by those skilled in the art without in any way departing from the scope of the invention. The matrices $H_n H_n^H$, $n=1, \ldots, N$ being diagonalizable and their eigen values being real and positive, denoted $\gamma_n^m$, $m=1, \ldots, M_n$, for the matrix $H_n H_n^H$, it will be possible to use gain functions other than the sum of the eigen values given in (4), for example their product $$\prod_{m=1}^{M_n} \gamma_n^m$$

(or, equivalently, $$\sum_{m=1}^{M_n} \log(\gamma_n^m)\bigg).$$

The second selection criterion is a capacity criterion. If it is assumed that the transmission of the symbols is performed by means of the modes associated with the block $H_n$, the capacity of the channel, assumed with linear response, is given by:

$$C_n = \sum_{m=1}^{M_n} \log\left(1 + \gamma_n^m \frac{P_e}{M_n N_0}\right) \tag{7}$$

in which $P_e$ is the total transmission power, distributed over the $M_n$ modes. The ratio $$\gamma_n^m \frac{P_e}{M_n N_0}$$

represents the signal-to-noise ratio on reception over the mode m. With high signal-to-noise ratio level, the capacity of the channel can be approximated by:

$$C_n = M_n \log\left(\frac{P_e}{M_n N_0}\right) + \sum_{m=1}^{M_n} \log(\gamma_n^m) \tag{8}$$

It is then possible to choose the mode subset $n_{opt}$ that makes it possible to obtain the maximum transmission capacity, i.e.:

$$n_{opt} = \underset{n=1,\ldots,N}{\mathrm{argmax}}(C_n) \tag{9}$$

Finally, it will be possible to use a hybrid selection criterion based on both the gain and the transmission capacity. In this case, the mode subset $n_{opt}$ best bearing out this criterion is given by:

$$n_{opt} = \underset{n=1,\ldots,N}{\mathrm{argmax}}(\Phi(C_n, \gamma_n)) \tag{10}$$

in which $\Phi$ is an increasing function of $C_n$ and $\gamma_n$. This function will for example be able to be a linear or nonlinear combination of $C_n$ and $\gamma_n$, the weighting coefficients depending on the priority that is wanted to be assigned to the transmission capacity and to the gain.

Whatever the criterion retained, the abovementioned selection method makes it possible to reduce the number of modes from M to $M'=M_{n_{opt}}$.

This reduction can advantageously be made with constant useful bit rate by increasing the degree of modulation of the symbols transmitted. More specifically, if Q was the cardinal of the modulation alphabet before reduction of the number of modes, it will be possible to choose a modulation alphabet of cardinal Q' such that:

$$M' \log Q' = M \log Q \tag{11}$$

For example, if the initial number of modes is M=6 with a 4-QAM modulation it will be possible to use an 8-QAM modulation over M'=4 modes or a 16-QAM modulation over M'=3 modes. The increase in the degree of modulation is accompanied necessarily by a corresponding degradation of the performance levels in terms of bit error ratio (BER). It is then possible to compensate for this degradation by using a space-time coding as described in the application FR-A-2977099 cited in the introductory part.

Generally, in the case where a space-time coding is implemented, the symbols are transmitted in blocks, a block of symbols being transmitted over a transmission interval (TTI), using a space-time code matrix, C, whose rows correspond to the different modes and columns to the successive uses of the channel (channel uses) during the transmission interval. The space-time coding makes it possible to combat the gain disparities that may exist within the selected mode subset.

FIG. 1 represents a flow diagram of a mode selection method for a system for MIMO transmission over multimode optical fiber, according to a first embodiment of the invention.

It is important to note that this selection will be able to be performed once for all, at the time of installation of the system or of the receiver. Alternatively, if a return channel is provided to the transmitter, this selection will be able to be made periodically, to take account of the drift/aging or of the replacement of the components (amplifiers in particular), the index $n_{opt}$ then being transmitted over this channel by the receiver.

In any case, the selection method comprises, in a first step 110, a measurement of the transfer matrix of the transmission channel H, over a set of modes, even all of the modes of the optical fiber.

The measurement of the transfer matrix can be performed, as is known per se, by means of pilot symbols transmitted by the transmitter.

In the step 120, the transfer matrix H is transformed into a block diagonal matrix. This transformation can comprise a thresholding of the elements of the matrix. For example, all the (complex) elements of the matrix whose modulus is below a predetermined threshold are set to zero. If, after thresholding, the matrix does not exhibit a block diagonal structure, the rows and the columns of the matrix are reorganized so as to group together the modes in mode subsets. The mode subsets are such that the modes belonging to a particular subset are coupled together and the modes belonging to distinct subsets are not coupled. The reorganization consists in performing a series of permutations on the rows and the columns, the permutations on the rows and the columns being identical (H is a square matrix).

In the step 130, a gain and/or a transmission capacity are determined for each of the mode subsets associated with the blocks of the transfer matrix. In other words, the values $\gamma_n$, and/or $C_n$ n=1, ..., N are calculated as explained previously.

In the step 140, the mode subset corresponding to the highest gain and/or capacity are selected in terms of a predetermined criterion, for example according to one of the criteria (5), (6), (9) or (10).

The MIMO transmission system then uses only the mode subset selected to transmit the symbols.

If necessary, this reduction of the number of modes will be able to be accompanied by a correlative increase in the degree of modulation of the symbols to be transmitted, even a space-time coding as described previously. The degree of modulation will also be able to be chosen to be different for the different modes. It is in fact understood that a degree of modulation will notably be able to be chosen to be commensurately higher for a mode when the signal/noise ratio in reception on this mode is itself higher.

The second embodiment of the invention relates to a core selection method for a system for MIMO transmission over multicore optical fiber.

The presentation given for the mode subset selection will not be repeated fully for reasons of brevity. It will however clearly emerge to those skilled in the art that the couplings between cores in a multicore fiber will have to be treated in the same way as the couplings between modes of a multimode fiber.

Only the general presentation of the core selection method will be described in relation to FIG. 2.

Figure 2:
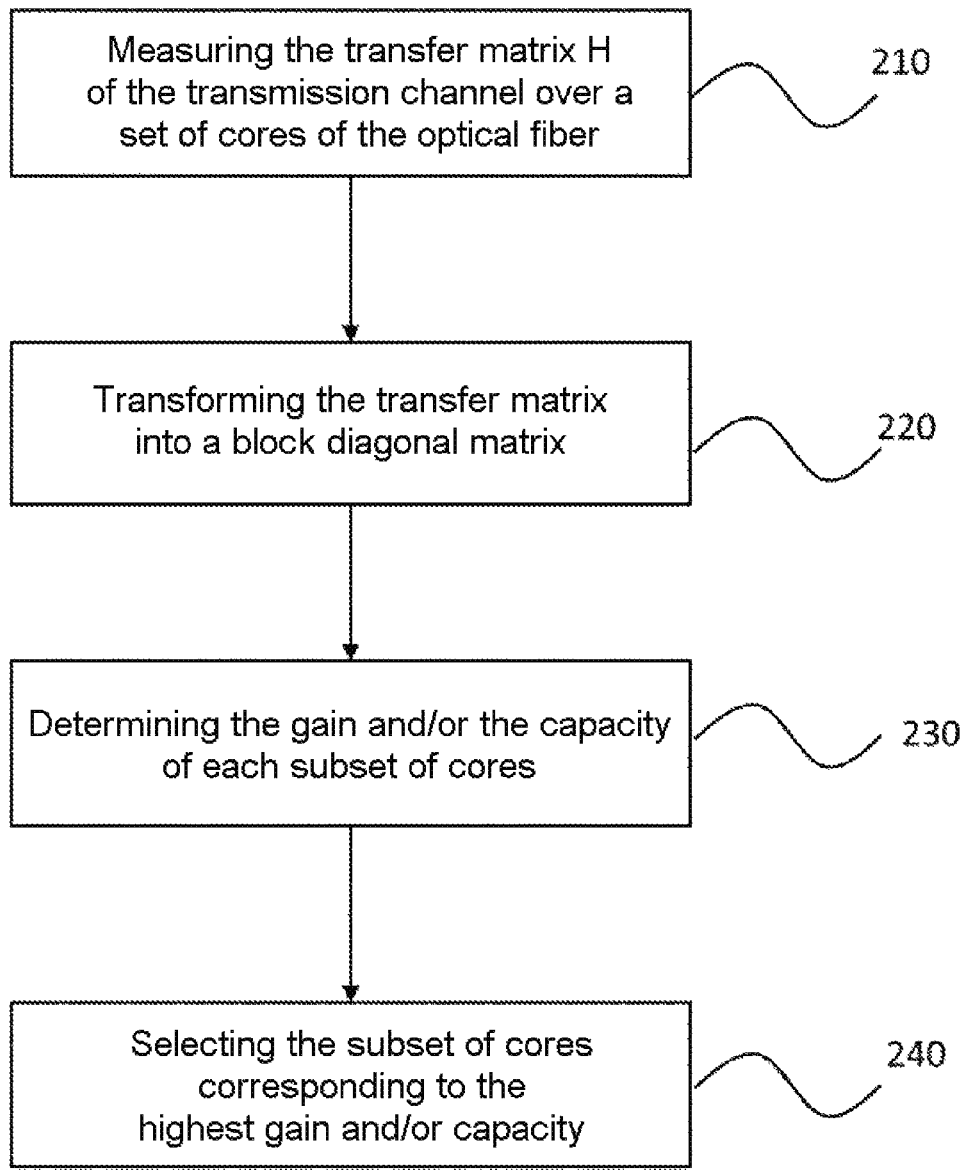
FIG. 2 schematically represents a core selection method for a system for MIMO transmission over multicore optical fiber, according to a second embodiment of the invention.

As for the selection of modes of FIG. 1, the core selection according to FIG. 2 will be able to be performed once and for all, upon the installation of the system, or else periodically and adaptively, if the system has a return channel.

The selection method comprises, in a first step 210, a measurement of the transfer matrix of the transmission channel H, over a set of cores of the multicore fiber, preferably over all the cores of this fiber.

Here again, the transfer matrix can be measured as is known per se by means of pilot symbols transmitted by the transmitter.

In the step 220, the transfer matrix H is transformed into a block diagonal matrix. This transformation can comprise a thresholding of the elements of the matrix and a reorganization of the modes into subsets by permutations of the rows and of the columns. The core subsets are such that the cores belonging to a particular subset are coupled together and the cores belonging to distinct subsets are not coupled.

In the step 230, a gain and/or a transmission capacity are determined for each of the subsets of the cores associated with the blocks of the transfer matrix. In other words, the values $\gamma_n$, and/or $C_n$ n=1, ..., N are calculated as explained previously, the calculations relating to the cores instead of modes of the fiber.

In the step 240, the core subset corresponding to the highest gain and/or capacity in the sense of a predetermined criterion are selected, for example according to one of the criteria (5), (6), (9) or (10).

The MIMO transmission system then uses only the core subset selected to transmit the symbols.

Finally, this reduction of the number of cores will be able to be accompanied by a correlative increase in the degree of modulation of the symbols to be transmitted, even a space-time coding as described previously. As in the first embodiment, the degree of modulation will be able to be chosen to be different for the different cores, as a function of the signal-to-noise ratio on each of these cores.

The invention claimed is:

1. A mode selection method for a system for MIMO transmission over a multimode optical fiber comprising:
   measuring a transfer matrix of a transmission channel made up of a set of modes of said optical fiber;
   transforming said transfer matrix into a block diagonal matrix, each block relating to a subset of modes of said optical fiber;
   determining a gain and/or a transmission capacity for each of the mode subsets associated with said blocks;
   selecting the mode subset corresponding to the highest gain and/or to the highest capacity, the MIMO transmission system then using only the modes of the subset thus selected to transmit over said optical fiber.

2. The mode selection method as claimed in claim 1, wherein said step of transforming the transfer matrix comprises:
   a thresholding step, said thresholding step comprising setting all the elements of the matrix below a predetermined threshold value to zero,
   a step of reorganizing the transfer matrix thus obtained, by permutation of its rows and columns, the permutations on the rows and the permutations on the columns being identical.

3. The mode selection method as claimed in claim 1, wherein the mode subset is selected according to the gain criterion $$n_{opt} = \underset{n=1,\ldots,N}{\operatorname{argmax}} (\gamma_n)$$

in which $\gamma_n = \operatorname{Tr}(H_n H_n^H)$, N being the number of mode subsets, $H_n$ being the transfer matrix of the transmission channel reduced to the modes of the subset n, $H_n^H$ being the conjugate transpose matrix of $H_n$ and $\operatorname{Tr}(\bullet)$ being the trace function.

4. The mode selection method as claimed in claim 1, wherein the mode subset is selected according to a gain criterion $$n_{opt} = \underset{n=1,\ldots,N}{\operatorname{argmax}} \left(\frac{\gamma_n}{M_n}\right)$$

in which $\gamma_n = \operatorname{Tr}(H_n H_n^H)$, N being the number of mode subsets, $M_n$ being the cardinal of the subset n, $H_n$ being the transfer matrix of the transmission channel reduced to the modes of the subset n, $H_n^H$ being the conjugate transpose matrix of $H_n$ and $\operatorname{Tr}(\bullet)$ being the trace function.

5. The mode selection method as claimed in claim 1, wherein the mode subset is selected according to a capacity criterion $$n_{opt} = \underset{n=1,\ldots,N}{\operatorname{argmax}} (C_n)$$

in which $$C_n = \sum_{m=1}^{M_n} \log\left(1 + \gamma_n^m \frac{P_e}{M_n N_0}\right),$$

$M_n$ being the cardinal of the subset n, $\gamma_n^m$ being the gain of the transmission channel on the mode m of the subset n, $P_e$ being the transmission power distributed over the $M_n$ modes and $N_0$ being the noise power on reception on a mode.

6. The mode selection method as claimed in claim 1, wherein the mode subset is selected according to a hybrid gain and capacity criterion $$n_{opt} = \underset{n=1,\ldots,N}{\operatorname{argmax}} (\Phi(C_n, \gamma_n))$$

in which:
- $C_n$ is the capacity of the transmission channel reduced to the modes of the subset n,
- $\gamma_n$ is defined by $\gamma_n = \operatorname{Tr}(H_n H_n^H)$, with $H_n$ being the transfer matrix of the transmission channel reduced to the modes of the subset n, $H_n^H$ being the conjugate transpose matrix of $H_n$ and $\operatorname{Tr}(\bullet)$ being the trace function, and
- $\Phi(\bullet,\bullet)$ is an increasing function of $C_n$ and $\gamma_n$.

7. The mode selection method as claimed in claim 1, wherein in response to the selection of the mode subset, the degree of modulation of the symbols to be transmitted on the different modes is chosen to be equal to a value Q' such that M' log Q'=M log Q, in which M is the cardinal of the mode set before selection, M' is the cardinal of the mode subset selected and Q is the degree of modulation of the symbols to be transmitted before the selection of the mode subset.

8. The mode selection method as claimed in claim 1, wherein in response to the selection of the mode subset, the degree of modulation of the symbols to be transmitted on the different modes is chosen to be different for the different modes of the mode subset.

9. The mode selection method as claimed in claim 8, wherein the symbols to be transmitted are subjected to a space-time coding, the elements of the space-time code being then transmitted only on the modes of said selected mode subset.

10. A core selection method for a system for MIMO transmission over a multicore optical fiber comprising:
- measuring a transfer matrix of a transmission channel made up of a set of cores of said optical fiber;
- transforming said transfer matrix into a block diagonal matrix, each block relating to a subset of cores of said optical fiber;
- determining a gain and/or a transmission capacity for each of the core subsets associated with said blocks;
- selecting the core subset corresponding to the highest gain and/or the highest capacity, the MIMO transmission system then using only the cores of the subset thus selected to transmit over said optical fiber.

11. The core selection method as claimed in claim 10, wherein said step of transforming the transfer matrix comprises:
- a thresholding step, said thresholding step comprising setting all the elements of the matrix below a predetermined threshold value to zero,
- a step of reorganizing the transfer matrix thus obtained, by permutation of its rows and columns, the permutations on the rows and those on the columns being identical.

12. The core selection method as claimed in claim 10, wherein the core subset is selected according to the gain criterion $$n_{opt} = \underset{n=1,\ldots,N}{\operatorname{argmax}} (\gamma_n)$$

in which $\gamma_n = \operatorname{Tr}(H_n H_n^H)$, N being the number of core subsets, $H_n$ being the transfer matrix of the transmission channel reduced to the cores of the subset n, $H_n^H$ being the conjugate transpose matrix of $H_n$ and $\operatorname{Tr}(\bullet)$ being the trace function.

13. The core selection method as claimed in claim 10, wherein the core subset is selected according to the gain criterion $$n_{opt} = \underset{n=1,\ldots,N}{\operatorname{argmax}} \left(\frac{\gamma_n}{M_n}\right)$$

in which $\gamma_n = \operatorname{Tr}(H_n H_n^H)$, N being the number of core subsets, $M_n$ being the cardinal of the subset n, $H_n$ being the transfer matrix of the transmission channel reduced to the cores of the subset n, $H_n^H$ being the conjugate transpose matrix of $H_n$ and $\operatorname{Tr}(\bullet)$ being the trace function.

14. The mode selection method as claimed in claim 10, wherein the core subset is selected according to a capacity criterion $$n_{opt} = \underset{n=1,\ldots,N}{\operatorname{argmax}} (C_n)$$

in which $$C_n = \sum_{m=1}^{M_n} \log\left(1 + \gamma_n^m \frac{P_e}{M_n N_0}\right),$$

$M_n$ being the cardinal of the subset n, $\gamma_n^m$ being the gain of the transmission channel on the core m of the subset n, $P_e$ being the transmission power distributed over the $M_n$ cores and $N_0$ being the noise power on reception on a core.

15. The core selection method as claimed in claim 11, wherein the core subset is selected according to a hybrid gain and capacity criterion $$n_{opt} = \underset{n=1,\ldots,N}{\mathrm{argmax}}\, (\Phi(C_n, \gamma_n))$$

in which:
$C_n$ is the capacity of the transmission channel reduced to the cores of the subset n,
$\gamma_n$ is defined by $\gamma_n = \mathrm{Tr}(H_n H_n^H)$ with $H_n$ being the transfer matrix of the transmission channel reduced to the cores of the subset n, $H_n^H$ being the conjugate transpose matrix of $H_n$ and $\mathrm{Tr}(\bullet)$ being the trace function, and
$\Phi(\bullet,\bullet)$ is an increasing function of $C_n$ and $\gamma_n$.

16. The core selection method as claimed in claim 10, wherein in response to the selection of the core subset, the degree of modulation of the symbols to be transmitted on the different cores is chosen to be equal to a value Q' such that M' log Q'=M log Q in which M is the cardinal of the set of cores before selection, M' is the cardinal of the core subset selected and Q is the degree of modulation of the symbols to be transmitted before the selection of the core subset.

17. The core selection method as claimed in claim 15, wherein in response to the selection of the core subset, the degree of modulation of the symbols to be transmitted on the different cores is chosen to be different for the different cores of the subset.

18. The core selection method as claimed in claim 17, wherein the symbols to be transmitted are subjected to a space-time coding, the elements of the space-time code being then transmitted only on the cores of said mode subset selected.

* * * * *